(No Model.) 3 Sheets—Sheet 1.

E. W. ANTHONY.
Grate for Stoves.

No. 229,852. Patented July 13, 1880.

WITNESSES
A. J. Oettinger
F. F. McClintock.

INVENTOR
E. W. Anthony
by his attys
Clarke & Raymond (No Model.) 3 Sheets—Sheet 2.

E. W. ANTHONY.
Grate for Stoves.

No. 229,852. Patented July 13, 1880.

WITNESSES
A. J. Oettinger
F. F. McClintock

INVENTOR
E. W. Anthony
by his attys
Clarke & Raymond

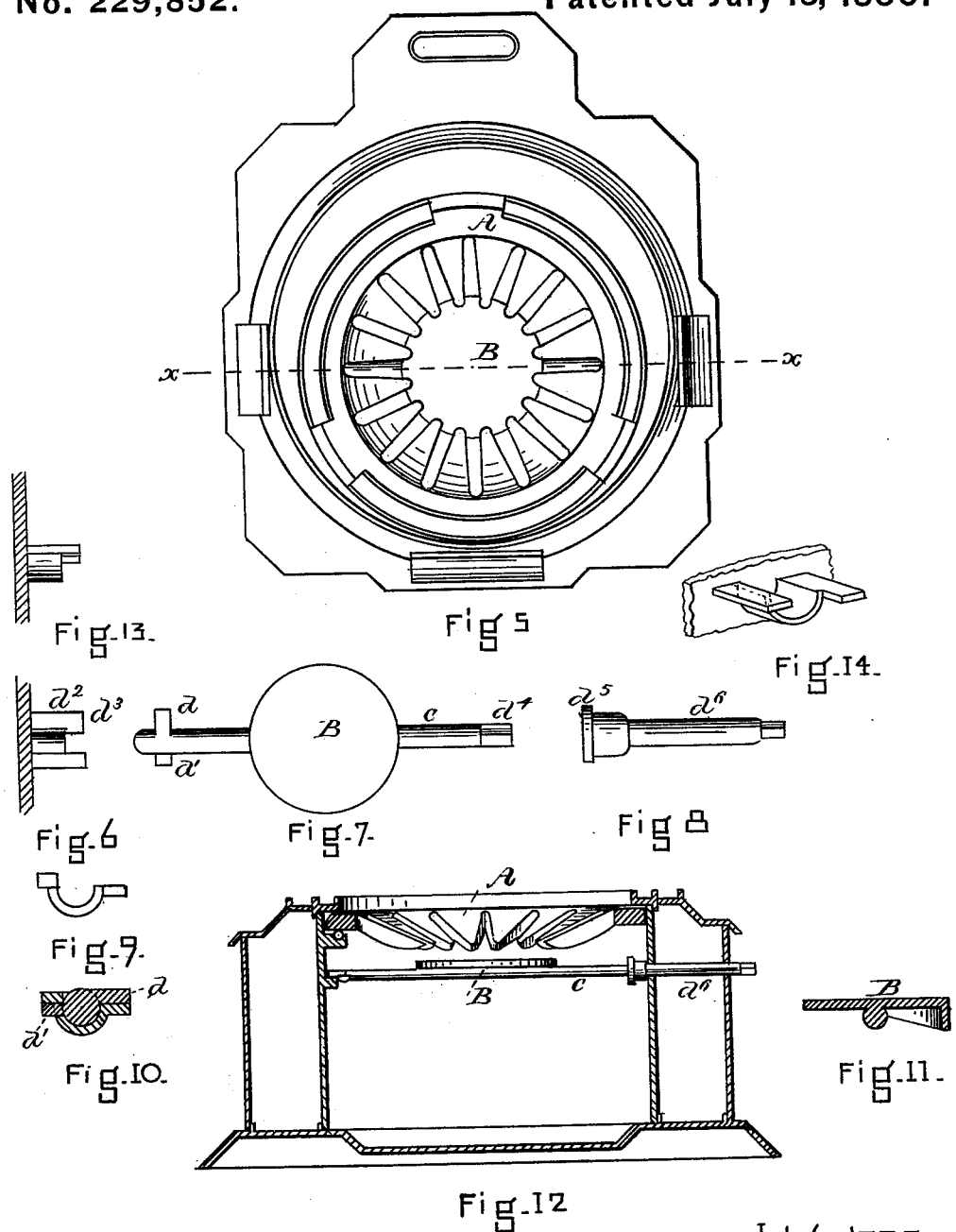

UNITED STATES PATENT OFFICE.

EDGAR W. ANTHONY, OF BOSTON, MASSACHUSETTS, ASSIGNOR TO SMITH & ANTHONY STOVE COMPANY, OF SAME PLACE.

GRATE FOR STOVES.

SPECIFICATION forming part of Letters Patent No. 229,852, dated July 13, 1880.

Application filed April 17, 1880. (No model.)

*To all whom it may concern:*

Be it known that I, EDGAR W. ANTHONY, of Boston, in the county of Suffolk and Commonwealth of Massachusetts, have invented an Improvement in Grates for Stoves and Furnaces, of which the following is a specification.

This invention has for its object the following-described improvement in grates for stoves and furnaces, reference being had to the accompanying drawings, forming a part of this specification, in explaining its nature, in which—

Figure 1:
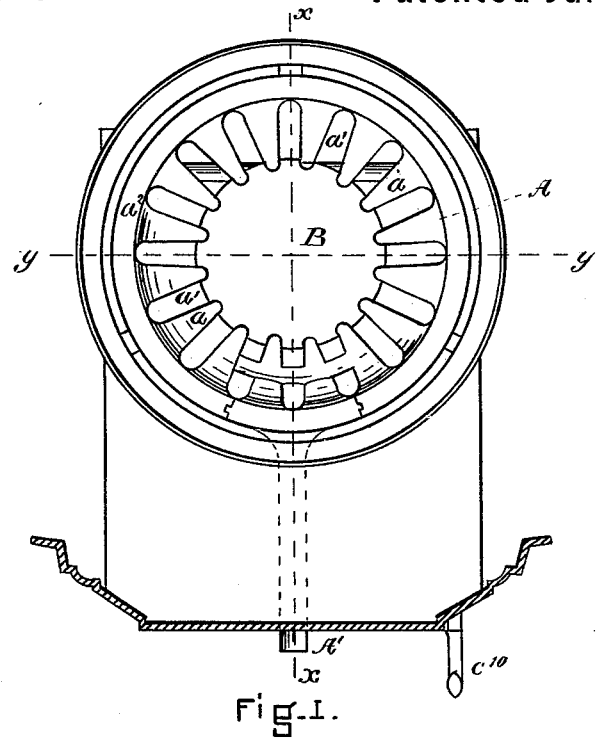
Figure 2:
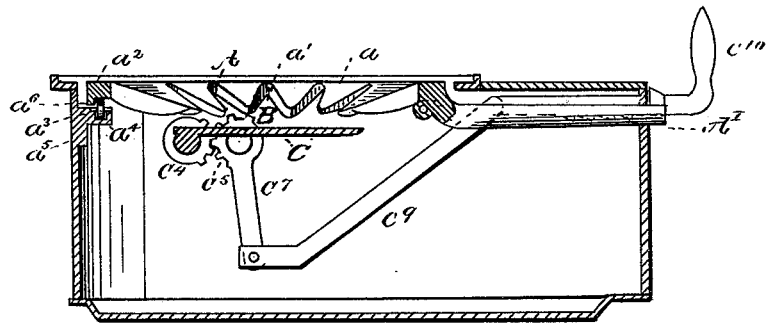
Figure 3:
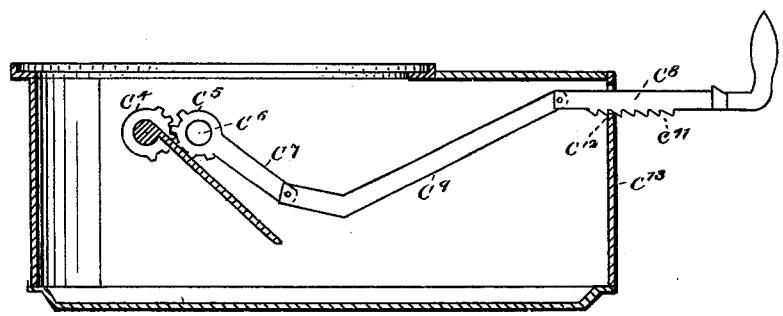
Figure 4:
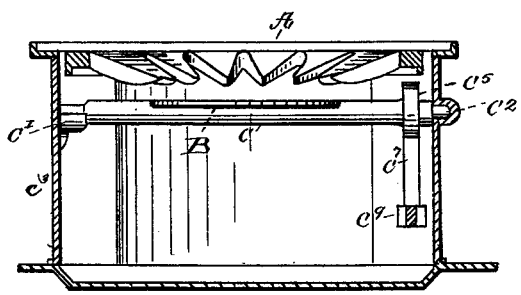

Figure 1 is a plan of a form of grate I design more especially for furnaces. Fig. 2 is a vertical section thereof on the line $x$ $x$ of Fig. 1. Fig. 3 is also a vertical section on the line $x$ $x$ of Fig. 1. Fig. 4 is a section on the line $y$ $y$ of Fig. 1. Fig. 5 is a plan illustrating the application of my improvement to stoves. Figs. 6, 7, 8, 9, 10, 11, 13, and 14 are detail views, representing one method of hanging the lower grate, and devices employed in connection therewith, and Fig. 12 is a vertical section on the line $x$ $x$ of Fig. 5.

This improvement relates to that class of grates in which a main grate surrounding a central opening and an independent auxiliary or lower grate are employed; and it consists in providing the lower grate with a tipping movement, preferably toward the ash-pit door, and the main grate with a reciprocating movement upon its center, independent of the tipping movement imparted to the lower grate, and also in devices for operating the lower grate from the neighborhood of the ash-pit door for hanging it, and for various details in construction.

A represents the main grate. It preferably is constructed with the series of short grate-bars $a$ and recesses $a'$, arranged around the opening B, and it is desirable that the bars be inclined upon their upper surface from the outer edge downwardly, substantially as shown.

The bars are cast with the outer ring, $a^2$, and the entire grate is supported upon the anti-friction rolls $a^3$, which are provided with suitable bearings in the lugs or brackets $a^4$, each of which projects inwardly from one of the plates $a^5$. A lip, $a^6$, is arranged upon the lower edge of the ring $a^2$ to project downwardly, and, in connection with the rolls $a^3$, it acts as a guide in preventing lateral movement of the grate, and thus holds it in proper position.

Below the opening B in the main grate is arranged the lower grate, C. This grate may or may not be solid, as desired. For furnaces it is provided with the shaft $c$ at the rear end, one end of which is provided with a bearing in the bracket $c'$, and the other end projects into the recess $c^2$ in the plate $c^3$.

A segment-gear, $c^4$, is arranged on the shaft near one end, and the segment-gear $c^5$, pivoted at $c^6$, and having the arm $c^7$, is arranged to mesh with it. When the grate is in a horizontal position the arm $c^7$ is in an inclined or vertical position, and by moving the arm upwardly on its center the two segmental gears raise the grate.

In order that the grate may be operated in this manner from the front of the furnace I connect the lower end of the arm $c^7$ with the push-bar $c^8$ by means of the bent connecting-bar $c^9$. The push-bar is provided with a handle, $c^{10}$, and with notches $c^{11}$ upon its under surface, which engage with the edge $c^{12}$ of the plate $c^{13}$, through which the push-bar passes. The main grate A is reciprocated by means of the lever or handle A'.

When my improved grate is used for stoves I prefer that the shaft $c$ be arranged to extend horizontally across the center instead of at one end, and in order that it may be easily secured in place I provide one end of the shaft with the starts $d$ $d'$, which are arranged, together with the end of the shaft, to fit into a recess in the bracket $d^2$, having the projections $d^3$ upon its end, the upper, lower, and side surfaces of which, in connection with the starts $d$ $d'$, act as stops in preventing the grate from being tipped backward and from being tipped too far downwardly. The starts and upper surface of the back projection and the under surface of the front projection control the backward movement, and the starts and the opposing side surfaces of the projections $d^3$ the downward movement. The other end, $d^4$, of the shaft is squared, and fits into the socket $d^5$, which is arranged upon the end of the arm $d^6$ which extends through the side plates of the stove, from whence it can be turned in tipping the grate either by a handle or lever, or by any other suitable device. The under part of the back portion of the grate is weighted, in order that the grate may remain in a horizontal position after it has been moved back into place.

It will be observed that the lower grate is arranged below the upper grate sufficiently far to form a vertical clearance between its upper edge and the lower surface of the grate-bars of the main grate.

It will also be observed that when the lower grate is solid the air for supporting combustion is obliged to enter around the wall of the combustion-chamber, so that the fire burns from the exterior inwardly, thereby insuring a uniform combustion of the fuel at all times.

It will further be observed that by providing the lower grate with a tipping movement toward the front of the furnace or stove or ash-pit door clinkers and ashes can be very readily removed without letting the fire completely down, the grate being lowered sufficiently to enable the ashes to be scraped off and clinkers removed, and then raised again to its normal position; also, that by arranging the mechanism for operating the lower grate in the manner described its position is readily determined, and may be changed while the clinkers are being removed, as the nature of the case requires.

Having thus fully described my invention, I claim and desire to secure by Letters Patent of the United States—

1. In combination with the main grate A, shaped and supported substantially as described, and means for reciprocating the same, the grate C, as described, and adapted to be tipped in relation to the upper grate, but not to be reciprocated therewith, substantially as and for the purposes set forth.

2. A stove or furnace provided with a main grate, A, having an opening, B, and adapted to be reciprocated, with the grate C, placed below said opening B, capable of being tipped toward the ash-pit door, and having between its upper surface and the lower surface of said main grate a horizontal clearing-space, substantially as and for the purposes specified.

3. The combination of the main grate A, the lower grate, C, the push-bar $c^8$, and suitable connecting mechanism for operating the lower grate, all adapted to operate substantially as described.

4. The combination of the grate C, the gear $c^4$, the gear $c^5$, its operating-lever $c^7$, the arm $c^9$, and push-bar $c^8$.

5. The combination of the grate C, the segmental gears $c^4$ $c^5$, and means for revolving the gear $c^5$, substantially as and for the purpose described.

6. The combination of the grate C and the operating and connecting mechanism described with the push-bar $c^8$ and a stop, $c^{12}$, for locking the push-bar in any desired position, substantially as and for the purposes set forth.

7. The combination of the shaft $c$, provided with the starts $d$ $d'$, as described, with the bracket $d^2$, provided with the projections $d^3$, substantially as and for the purposes set forth.

EDGAR W. ANTHONY.

Witnesses:
F. F. RAYMOND, 2d,
A. J. OETTINGER.